United States Patent [19]

Fujisaki

[11] Patent Number: 4,926,035
[45] Date of Patent: May 15, 1990

[54] OPTICALLY READABLE CODE AND METHOD FOR COMMUNICATION

[76] Inventor: Seiro Fujisaki, 6-4, Fukushima 7-chome, Fukushima-Ku, Osaka-Shi, Osaka-Fu. 553, Japan

[21] Appl. No.: 265,400

[22] Filed: Oct. 31, 1988

[30] Foreign Application Priority Data

May 10, 1988 [JP] Japan .................. 63-113883

[51] Int. Cl.⁵ .................................. G06K 19/06
[52] U.S. Cl. ........................ 235/494; 235/454
[58] Field of Search ..................... 235/454, 494

[56] References Cited

U.S. PATENT DOCUMENTS 3,921,136 11/1975 Bar .................. 235/494 X
4,692,603 9/1987 Brass et al. ............. 235/454

Primary Examiner—Harold I. Pitts
Attorney, Agent, or Firm—Price, Gess & Ubell

[57] ABSTRACT

An optical readable code employing dots, wherein dot files are divided into eight groups perpendicular to the course of printing so that each group that consists of a plurality of dot files is separated from the other parts by divisions, each of which consist of one or several dot files; dot ranks are divided similarly; and each part divided up in this way is regarded as one bit mark. The combination of printed and blank dots in each bit mark optically expresses the information to be communicated; thus, the information is communicated by being coded and printed into the optically readable code, which is read and converted into information by a code reader.

7 Claims, 3 Drawing Sheets

THE COURSE OF PRINTING →

Fig.6
Fig.7
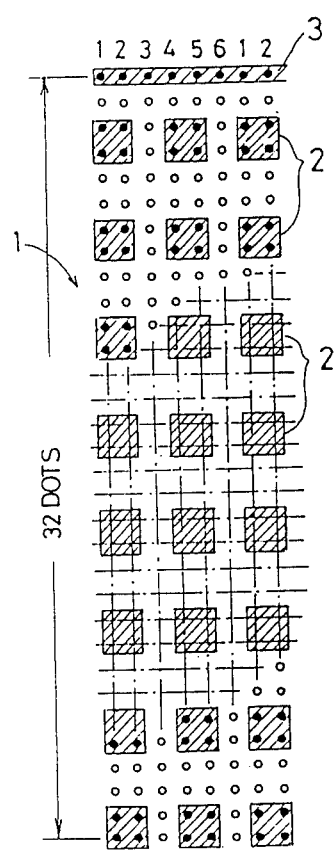
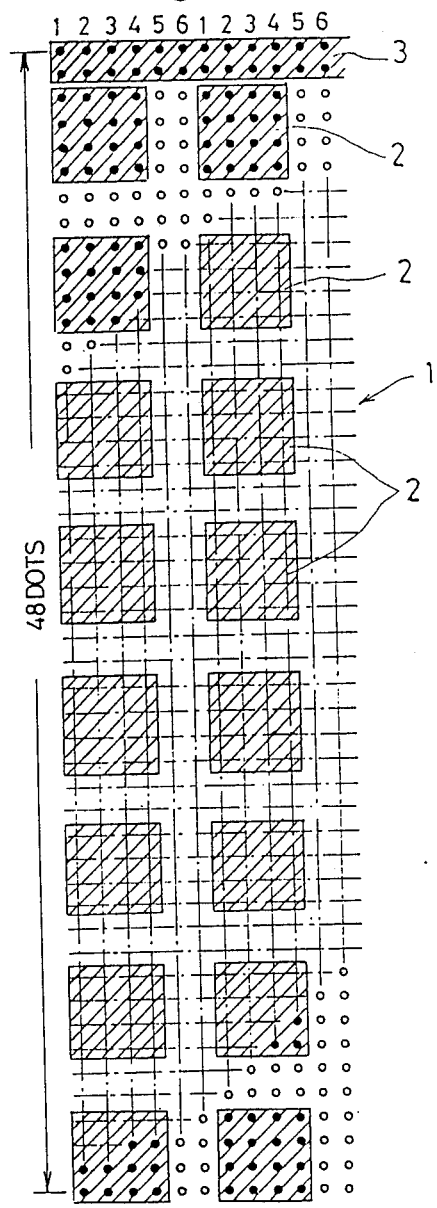

OPTICALLY READABLE CODE AND METHOD FOR COMMUNICATION

BACKGROUND OF THE INVENTION

The present invention relates to an optically readable code and a method for communication by using the code.

Conventionally, bar codes containing various data of merchandise are widely used for merchandise control. The bar code is generally printed on the packing paper of merchandise, or a label which is attached to an article or the packing paper of merchandise. The data on the bar code is read by a bar code reader when the article is forwarded, received and sold; and used for merchandise control and sales management. A bar code reader for such well-known bar codes is disclosed in Japanese Published Examined Patent Application No. 30613/1978.

To input literal data printed on packing paper and the like to a computer, the data is either read and inputted manually with a keyboard or read and inputted by an expensive Optical Character Reader (hereinafter referred to as OCR).

However, bar code is not adequate for more precise merchandise control since the information expressed by the bar code is small in quantity. Therefore, it is difficult to adapt the bar code in other fields that require more information than is required for merchandise control.

Furthermore, a special apparatus is required to generate or revise the bar code, which prevents ready generation or correction of the bar code.

Moreover, the input of literal data to a computer by means of a keyboard is labor and time consuming, and the use of the expensive OCR results in a high cost.

SUMMARY OF THE INVENTION

The first object of the present invention is to provide an optically readable code capable of expressing a large quantity of data in a small space that can be used readily at a low cost and a method for communication by using the code.

The second object of the present invention is to provide an optically readable code employing dots that are divided into eight groups perpendicular to the course of printing so that each group that consists of a plurality of files is separated from the other groups by divisions, each of which consists of one or several files; and, at the same time, ranks of dots are divided similarly in order for each part divided up in this way to be used as one bit mark. This code can express more than sixty-four bits of information in a space for one letter printed by a dot printer;, therefore, given that one letter is expressed by sixteen bits, information equivalent to four letters can be expressed. Thus, the present code expresses a large quantity of information and takes a small space in comparison with the bar code. Accordingly, the present code can be adapted in various fields and, at the same time, the bit marks are readily made and changed by means of a dot printer attached to a personal computer and the like.

The third object of the present invention is to provide an optically readable code that accomplishes the second object, wherein one or several ranks along the printing course serve as a leading mark for indicating a standard for a reading position. The leading mark of the optically readable code formed in this manner is used to distinguish between the top and the bottom of the code and to direct the reader to take a straight course on the code in order to avoid a mistake in reading.

The fourth object of the present invention is to provide a method of communication in which information to be communicated is coded and printed into the optically readable code that accomplishes the second and the third objects, and then read and converted into information by an optical code reader. By this method the bit marks printed by the dot printer are read and communicated by an optical code reader of simple structure that can read the least bit marks; thus, the optical code reader is inexpensive. By printing data both in letters and corresponding codes, literal information is inputted to a computer at a lower cost.

Other objects and features of the present invention will become apparent from the following description with reference to the accompanying drawings.

BRIEF DESCRIPTION OF THE DRAWINGS

FIG. 6 is a diagram showing the arrangement of the bit marks of the optically readable code printed by a 32-dot image printer; and FIG. 7 is a diagram showing the arrangement of the bit marks of the optically readable code printed by a 48-dot image printer.

DETAILED DESCRIPTION OF THE INVENTION

Embodiments of the present invention will be described below.

Figure 1:
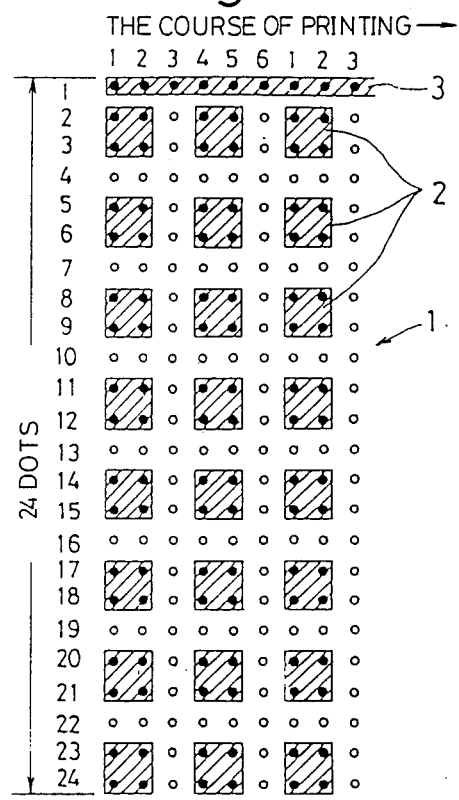
FIG. 1 is a diagram of an embodiment of the present invention showing the arrangement of the bit marks of the optically readable code.
Figure 2:
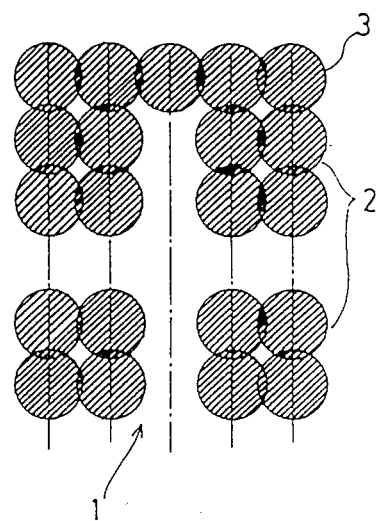
FIG. 2 is a partial enlarged view showing the appearance of the printed marks in FIG. 1.
Figure 3:
FIG. 3 is a plan view showing the appearance of the printed marks in FIG. 1 in the exact size.
Figure 4:
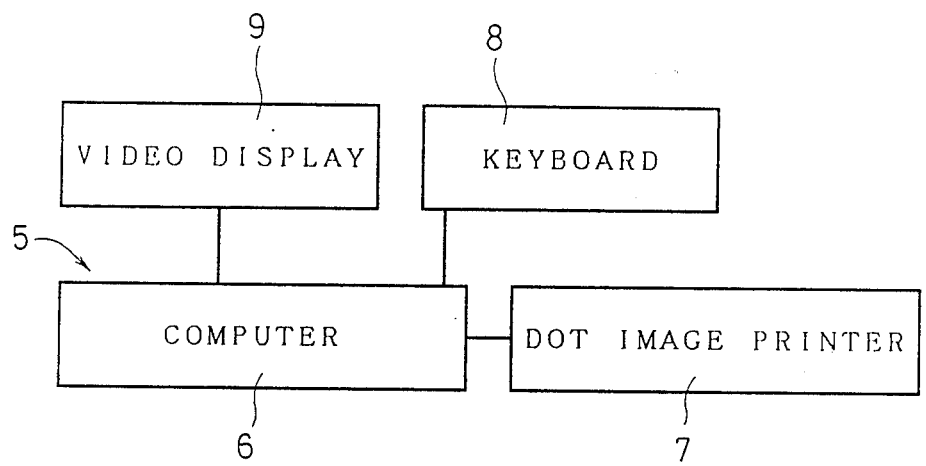
FIG. 4 is a block diagram showing a code printer for printing the optically readable code employing bit marks as in FIG. 1.
Figure 5:
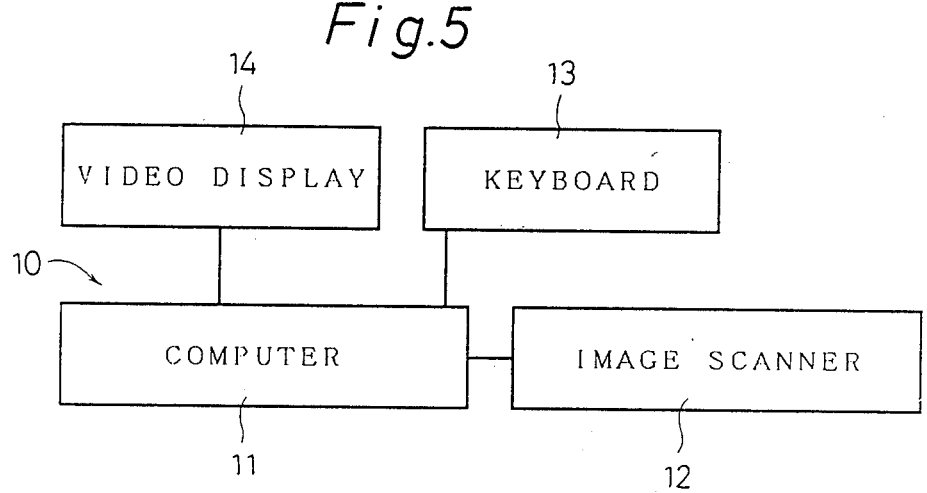
FIG. 5 is a block diagram showing a code reader for reading the opticaly readable code employing bit marks as in FIG. 1.

As shown in FIGS. 1 through 3, an optically readable code 1 is generated by such a 24-dot image printer as shown in FIG. 4. Among twenty-four dot ranks of the code 1, the first rank serves as a leading mark forming section; and the fifth and the sixth ranks serve as a second bit mark forming section. The same rule applies to the following portions; a space that consists of one rank and a bit mark forming section that consists of two ranks are repeated in series. The group of printed dots of the code 1 is divided into eight bit mark forming sections in a position totally perpendicular to the course of printing.

Similarly, the first and the second files of the dots serve as the first bit mark forming section, while the third file serves as a space forming section between the first and the second bit mark forming section. Again, the same rule applies to the following portions: a bit mark forming section that consists of two files and a space that consists of one file are repeated. In this way eight bit marks 2 are formed for every three files of dots along the course of printing, while the first rank of dots is printed without any breaks and serves as a leading mark 3.

Every eight bit marks 2 formed within three files expresses one letter. Therefore, information equivalent to eight letters, each of which is expressed by the combination of printed and blank dots, are expressed in a 24 dot by 24 dot space, which is usually used for one letter. It serves as well to express one letter with sixteen bit marks from the first file through the sixth file. In this case information equivalent to four letters can be expressed in the usual space for one letter.

FIG. 1 schematically shows the arrangement of the dots and the relationships among the bit marks 2 and the leading mark 3. The actual appearance of the printed dots is shown in FIG. 3, a part of which is magnified in FIG. 2.

The above optically readable code 1 is formed by printing with a code printer 5 in FIG. 4 on any kind of paper. The code printer 5 is provided with a dot printer 7, which is controlled by a computer 6. The data, reconfirmed on a video display 9, is first inputted to the computer 6 from a keyboard 8, next converted by the computer 6 into the code that corresponds to the above optically readable code and then printed by the dot image printer 7.

The printed optically readable code 1 is read by a code reader 10 so as to be converted into an information signal and processed adequately. The code reader 10 comprises an image scanner 12 for reading the optically readable code 1, a computer 11 for decoding and processing the signals from the image scanner 12, and a display 14 for displaying the data. Usually, the resolving power of the image scanner 12 is 16 dots/mm, which is capable of reading the optically readable code 1. The computer 11 starts reading under an order from a keyboard 13.

The optically readable code 1 described above can be used for product control. For example, the information of product control encoded by the code printer 5 can be printed on appropriate materials such as labels. The data of product control can be obtained in the process of product circulation by circulating products with labels which can be read by the code reader 10. Such a method enables more precise marchandise control than a method that employs the standard bar code, since the optically readable code can express more information than the bar code. Moreover, the code can be revised by reading the printed data, coding new data, in which a necessary change is made, printing the new data on a label by means of the code printer 5 and attaching the label to the article. Thus, it is easy to revise data in the middle of a distribution channel.

The above method also saves labor in storing printed literal information in a computer by printing the corresponding optically readable code 1 with the literal information in advance and reading the code by means of an image reader. Furthermore, the image reader can be a simple and inexpensive one that can read files each of which consists of eight bit marks.

The present invention offers a facile way of expressing a large quantity of information in a small space, which can be easily read by a simple image reader by employing a personal computer and a dot printer affiliated with the computer. Accordingly, the present invention can be adapted in various fields other than the field exemplified above.

A 32-dot image printer and 48-dot image printer will serve as well, although a 24-dot image printer is employed as the dot printer 7 in the above embodiment. The composition of the code that is printed by a 32-dot image printer will be as follows: the first dot rank serves as the leading mark 3 and the next dot rank serves as a space, below which two ranks for bit marks and two ranks for a space are repeated in series. At the same time, two dot files for bit marks and one dot file for a space are repeated along the course of printing. As for the code printed by a 48-dot image printer, all the sections consist of twice as many ranks and files as those of the code printed by a 24-dot image printer.

What is claimed is:

1. An optically readable code, comprising files of dots divided into eight groups perpendicular to the course of printing so that each group that consists of a plurality of files is separated from the other groups by divisions, each of which consists of one or several files ranks of dots are similarly divided; and each part divided up in this manner is regarded as a one bit mark.

2. An optically readable code as defined in claim 1, wherein one or several ranks along the printing course serve as a leading mark for indicating a standard for a reading position.

3. An optically readable code as defined in claim 2, wherein the leading mark is served as by the marginal dot rank along the printing course.

4. A method for communication, wherein information to be communicated is coded with dots by dividing dot files into eight groups perpendicular to the course of printing so that each group that consists of a plurality of dot files are separated from the other groups by divisions, each of which consists of one or several dot files, by dividing dot ranks similarly, and using each part divided up in this way as one bit marks.

5. A method for communication wherein information to be communicated is coded with dots by dividing dot files into eight groups perpendicular to the course of printing so that each group that consists of a plurality of dot files is separated from the other groups by divisions, each of which consists of one or several dot files, by dividing dot ranks similarly, and by using each part divided up in this way as one bit mark; whereby the code can be printed by a dot image printer, read by a code reader and converted into information.

6. An optically readable code for a data strip, comprising:
a series of coordinate dot positions, arranged in a predetermined manner that can be optically distinguishable, the dot positions form a pattern having 24 columns in one direction and at least six columns in a transverse direction, a first column has overlapping printed dots in the dot positions to provide a continuous leading mark section, subsequent pairs of column positions are divided by dot positions that are not printed to provide open spaces, the subsequent pairs of column positions provide eight-bit mark dot positions that can be appropriately printed to encode information as either printed dot positions or unprinted dot positions, whereby increased data can be encoded for subsequent optical reading.

7. A method of storing data in bit form on a data strip, including the steps of:
providing a series of dot print positions to form at least 24 sequentially spaced columns;
printing overlapping dots in the first column position to indicate a read start position;
printing any desired data in bit format in the dot print positions in the second and third columns;

leaving the fourth, seventh, tenth, thirteenth, sixteenth, nineteenth and twenty-second columns as open spaces, and printing any desired data in the respective columns between the open spaces, with each of the respective dot positions overlapping whereby an increased amount of data can be encoded in strip form for labeling objects.

* * * * *